United States Patent Office.

HIRAM M. CONKLIN, OF CARLSTADT, NEW JERSEY.

Letters Patent No. 100,730, dated March 15, 1870.

IMPROVED COMPOUND FOR MAKING CONCRETE PAVEMENTS.

The Schedule referred to in these Letters Patent and making part of the same.

*To all whom it may concern:*

Be it known that I, HIRAM M. CONKLIN, of Carlstadt, in the county of Bergen, and State of New Jersey, have invented a new and improved Compound for Making Concrete Pavement; and I do hereby declare that the following is a full, clear, and exact description thereof, which will enable others skilled in the art to make and use the same.

This invention relates to a new and useful compound for cementing gravel, sand, and other substances, to form concrete pavements, roadways, and the like.

The said compound consists of the ingredients mixed and compounded in the proportions and manner as follows:

I take one gallon pitch, one ounce shellac, melted together, to which I add one-half gallon pine-tar, heated separately to the boiling point, and to this, after cooling and transferring to another vessel, I add one-half pint of benzine, stirring the whole together.

With this compound I make concrete pavement by taking coarse sand screened and heated, but not sufficiently to scorch the compound, and spread upon the floorway, and applying as much of the mixture as will be taken up by the sand, and then spread the whole on the roadway while warm.

The benzine soon evaporates, and the matter becomes concrete in a very short time.

The quantity of benzine should be varied according to the atmospheric temperature, more being required in cold weather. Its office is to soften the other substances.

Tar and pitch, or resin (sometimes used) are too brittle of themselves when hard to make by admixture with sand good roadways, and soon wear away. I therefore mix shellac with the tar and pitch, which gives elasticity when hard, and which will also harden under the action of water.

Having thus described my invention,

I claim as new and desire to secure by Letters Patent—

1. The herein-described improved compound for the construction of concrete pavements and roadways, consisting of the ingredients specified, compounded and mixed in the manner described.

2. The combination with the same of sand or fine gravel, when heated and mixed with the same, and applied upon the road-bed as described.

The above specification of my invention signed by me this 14th day of September, 1869.

HIRAM M. CONKLIN.

Witnesses:
GEO. W. MABEE,
ALEX. F. ROBERTS.